(12) United States Patent
Loewe

(10) Patent No.: US 11,035,499 B2
(45) Date of Patent: Jun. 15, 2021

(54) DEVICE FOR RETAINING A LINE

(71) Applicant: ILLINOIS TOOL WORKS INC., Glenview, IL (US)

(72) Inventor: Hubert Loewe, Weselberg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/477,337

(22) PCT Filed: Jan. 19, 2018

(86) PCT No.: PCT/US2018/014307
§ 371 (c)(1),
(2) Date: Jul. 11, 2019

(87) PCT Pub. No.: WO2018/140297
PCT Pub. Date: Aug. 2, 2018

(65) Prior Publication Data
US 2019/0376623 A1 Dec. 12, 2019

(30) Foreign Application Priority Data
Jan. 27, 2017 (DE) .......................... 102017101644.9

(51) Int. Cl.
*F16L 3/10* (2006.01)
*B60R 16/02* (2006.01)
(Continued)

(52) U.S. Cl.
CPC ........ *F16L 3/1083* (2013.01); *B60R 16/0215* (2013.01); *B60R 16/08* (2013.01); *H02G 3/32* (2013.01)

(58) Field of Classification Search
CPC ... F16L 3/1083; F16L 3/00; F16L 3/01; F16L 3/02; F16L 3/06; F16L 3/10;
(Continued)

(56) References Cited

U.S. PATENT DOCUMENTS 4,478,381 A 10/1984 Pittion
4,669,156 A * 6/1987 Guido .................. F16L 3/2235
24/336

(Continued)

FOREIGN PATENT DOCUMENTS

CA 2413909 A1 6/2003
CN 102667181 A 9/2012
(Continued)

OTHER PUBLICATIONS

PCT, International Search Report and Written Opinion, International Application No. PCT/US2018/014307; dated May 11, 2018, 12 pages.

*Primary Examiner* — Nkeisha Smith
(74) *Attorney, Agent, or Firm* — Thompson Hine LLP

(57) ABSTRACT

A device for retaining a line includes an accommodating part having at least one line retaining portion and a bearing portion, and includes a closing part having a bearing portion. The closing part is mounted on the bearing portion of the accommodating part such that it can be rotated via its bearing portion. The closing part can be adjusted between an open position, in which it frees the at least one retaining portion, and a closed position, in which it closes the at least one retaining portion. The bearing portion of the accommodating part forms a through-opening enclosed by a bearing-portion wall, and the bearing portion of the closing part forms a through-opening enclosed by a bearing-portion wall. The bearing-portion wall of the accommodating part engages through the through-opening of the closing part, and the bearing-portion wall of the closing part engages through the through-opening of the accommodating part.

9 Claims, 5 Drawing Sheets

(51) Int. Cl.
  *B60R 16/08* (2006.01)
  *H02G 3/32* (2006.01)
(58) Field of Classification Search
  CPC ..... F16L 3/1008; F16L 3/1033; F16L 3/1041; F16L 3/1025; F16L 3/1091; B60R 16/0215; B60R 16/08; H02G 3/32
  See application file for complete search history.

(56) References Cited

U.S. PATENT DOCUMENTS

| | | | |
|---|---|---|---|
| 6,154,927 A | 12/2000 | Oi | |
| 8,882,072 B2* | 11/2014 | Hattori | F16B 21/075 248/346.03 |
| 9,518,684 B2* | 12/2016 | Juzak | F16B 35/06 |
| 9,551,438 B2* | 1/2017 | Frizzell | H02G 3/0456 |
| 9,866,005 B2* | 1/2018 | Feige | H02G 3/32 |
| 10,704,710 B2* | 7/2020 | Kim | F16L 3/1075 |
| 10,753,514 B2* | 8/2020 | Tran | F16L 3/14 |
| 2007/0018057 A1 | 1/2007 | Kovac | |
| 2012/0223207 A1 | 9/2012 | Hattori | |
| 2013/0009020 A1* | 1/2013 | Shirakabe | F16L 55/035 248/74.1 |
| 2014/0374544 A1* | 12/2014 | Pearson | F16L 3/12 248/68.1 |
| 2019/0226606 A1* | 7/2019 | Seo | F16L 55/035 |
| 2020/0080675 A1* | 3/2020 | White | F16L 37/1225 |

FOREIGN PATENT DOCUMENTS

| | | |
|---|---|---|
| CN | 105387298 A | 3/2016 |
| DE | 3126488 | 1/1983 |
| DE | 9407618 | 9/1995 |
| EP | 3203129 | 8/2017 |
| JP | 2008261447 A | 10/2008 |

\* cited by examiner

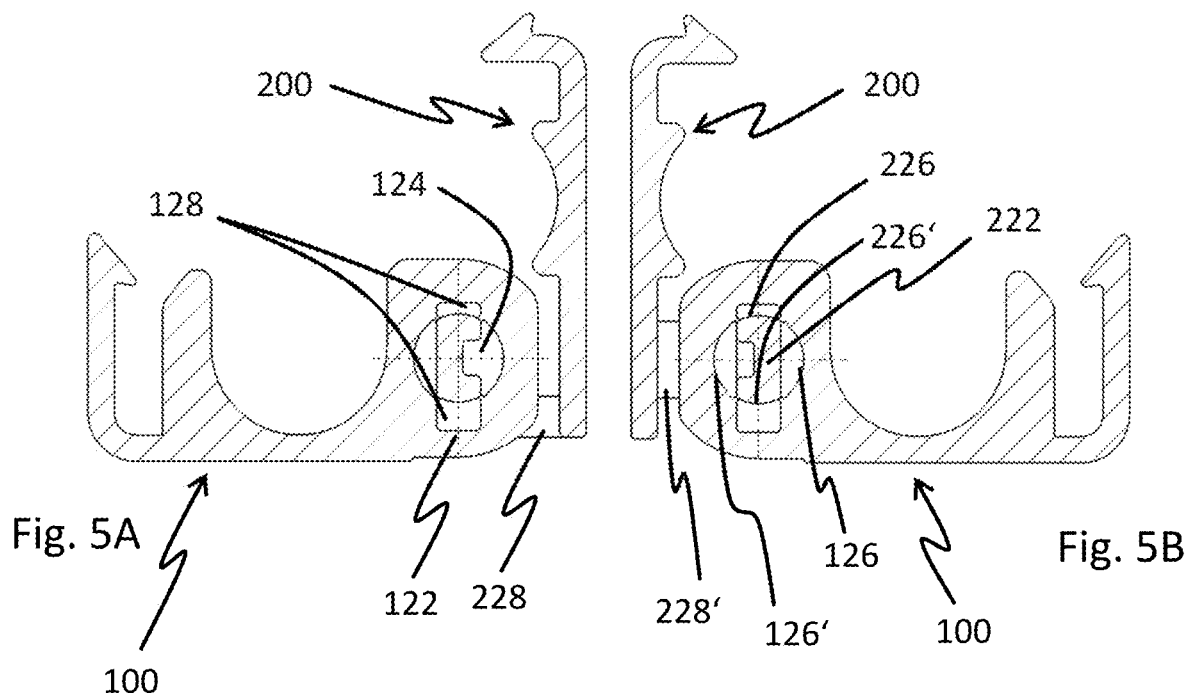
Fig. 5A
Fig. 5B
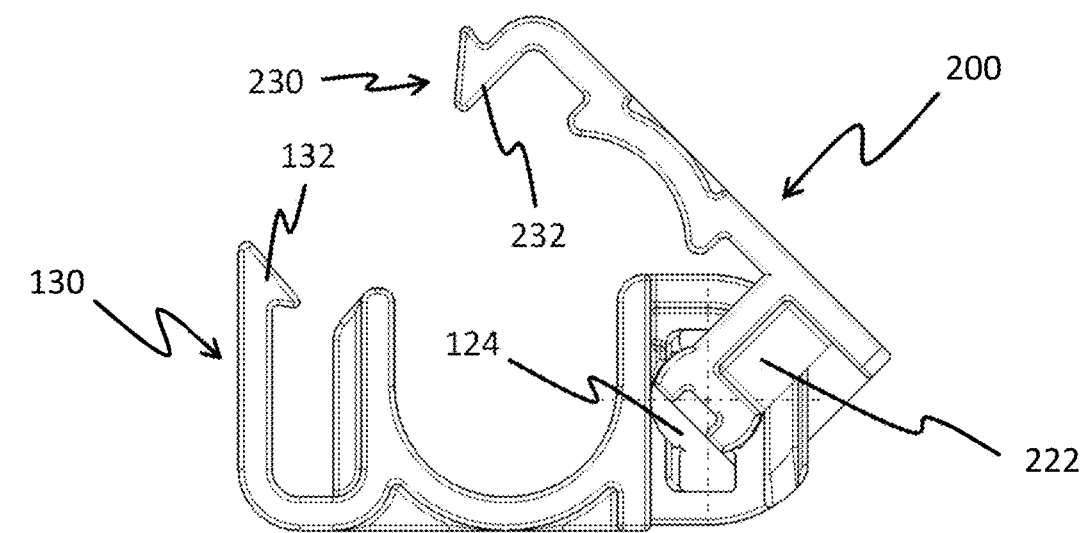
Fig. 6

DEVICE FOR RETAINING A LINE

TECHNICAL FIELD

The invention relates to a device for retaining a line, in particular multiple lines. The lines may be for example pipes for transporting liquid, or electric lines, which are to be guided along a certain path or held at a distance from one another.

BACKGROUND

Retaining devices for lines are used in motor vehicles. The lines may in particular be fuel lines, brake lines and/or electrical cables.

Known retaining devices may be in one piece and accommodate lines by clamping in a retaining portion. Also known are two-part retaining devices which comprise a lower part and an upper part designed as a clip, wherein a line that is to be accommodated is retained between the two parts.

A two-part retaining device is described in DE 94 07 618 U1. Four lines of identical diameter can be secured to a securing device, wherein the securing device has a girder-shaped lower part and a closing-clip-shaped upper part, which are connected by a hinge-like articulation. The hinge-like articulation consists of an articulation peg which is formed on the lower part and is accommodated by two articulation eyes formed on the upper part. However, under high mechanical loading, the articulation eyes can separate from the articulation peg, and hence undesired separation of the upper part and the lower part can occur.

DE 31 26 488 C2 describes a pipe collar having a lower collar clip and an upper collar clip that is pivotably connected to the lower collar clip via a living hinge. In the closed state of the pipe collar, a pipeline can be accommodated between the upper and lower collar clips. However, the living hinge can become damaged during use and transportation of the retaining device, and hence it is possible for the upper and lower collar clips to separate. Therefore, the known device has multiple locking mechanisms which are intended to prevent the pipe collar opening if the living hinge breaks or tears. However, even with these locking mechanisms, large mechanical loads can cause the upper and lower collar clips to separate. In addition, these locking mechanisms engage only in the closed position of the pipe collar and require additional work.

SUMMARY

The invention is therefore based on the object of providing a retaining device of the type mentioned in the introduction, whose constituent parts are connected to one another reliably and simply.

The invention achieves the object with a retaining device as claimed in claim 1. Advantageous configurations form the subject matter of the dependent claims, of the description and of the figures.

The device according to the invention for retaining a line comprises an accommodating part having at least one retaining portion, which is adapted to a line which is to be accommodated, and having a bearing portion, and also comprising a closing part having a bearing portion, wherein the closing part is mounted on the bearing portion of the accommodating part such that it can be rotated via its bearing portion, and therefore the closing part can be adjusted between an open position, in which it frees the at least one retaining portion, and a closed position, in which it closes the at least one retaining portion. The bearing portion of the accommodating part forms a through-opening which is enclosed by a bearing-portion wall, and the bearing portion of the closing part forms a through-opening which is enclosed by a bearing-portion wall. The bearing-portion wall of the accommodating part engages through the through-opening of the closing part, and the bearing-portion wall of the closing part engages through the through-opening of the accommodating part.

The retaining device according to the invention comprises an accommodating part and a closing part. The accommodating part has one or more retaining portions into which line(s) can be inserted. The lines can, as mentioned, be liquid-conveying lines or electric lines. The at least one retaining portion is adapted to the line that is to be accommodated such that an accommodated line can be held as securely as possible and largely without play. For example, the retaining portion can be adapted such that a wall of the retaining portion bears against the line over as much of the surface area of the latter as possible. Also, the closing part can have at least one retaining portion which can also be adapted to a line that is to be accommodated, and which can in particular correspond to the retaining portion of the accommodating part. A line that is accommodated in the retaining device can then be held between and by both of the retaining portions of the accommodating part and the closing part.

The accommodating part also has a bearing portion on which the closing part is mounted. The closing part also has a bearing portion. The accommodating part and the closing part of the retaining device are mounted, in particular rotatably, on one another by means of their respective bearing portions so that the accommodating part and the closing part can be pivoted relative to one another by means of their bearing portions. The rotatable mounting allows the accommodating part and the closing part to be moved between an open position and a closed position of the retaining device in order that an accommodated line can be accommodated or removed and securely retained.

According to the invention, the bearing portion of the accommodating part forms a through-opening of the accommodating part that is preferably completely enclosed by a bearing-portion wall of the accommodating part. The bearing portion of the closing part forms a through-opening of the closing part which is in turn preferably completely enclosed by a bearing-portion wall of the closing part. Thus, both the bearing portion of the accommodating part and the bearing portion of the closing part each have a through-opening. In particular, the accommodating part and the closing part cannot be separated from one another. Thus, the accommodating part and the closing part are connected to one another captively. Therefore, the connection existing between the accommodating part and the closing part cannot be released without destruction. This can be achieved for example by the respective bearing-portion wall completely enclosing the respective through-opening without leaving a gap. In this case, the closing part and the accommodating part are in particular produced together. A non-releasable connection of this kind can for example also be achieved by using particularly strong materials for the accommodating part and/or the closing part. In that case, the respective bearing-portion wall must fundamentally not completely enclose the respective through-opening. In this case, any gap in one of the bearing-portion walls must of course not be larger than a thickness of the respective other bearing-portion wall.

According to the invention, the bearing-portion wall of the accommodating part engages through the through-opening of the closing part and the bearing-portion wall of the closing part engages through the through-opening of the accommodating part. The accommodating part and the closing part are connected to one another via their respective bearing portions and through-openings in a manner similar to two links of a chain. Thus, the accommodating part and the closing part are connected to one another particularly securely. This is true both during transportation of the retaining device to the installation location and also during operation of the retaining device. The retaining device can therefore withstand even high loads. In particular, the through-openings can be completely enclosed by the respective bearing-portion wall. A completely enclosed through-opening provides a particularly secure connection between the accommodating part and the closing part. Especially in the case of a non-releasable connection between the accommodating part and the closing part, the retaining device is especially stable and reliable. First, the retaining device can hold an accommodated line particularly securely. Second, the constituent parts of the retaining device remain particularly securely connected to one another during transportation of the retaining device, in particular in the case of transportation in the open position of the retaining device.

According to another embodiment, at least one wall portion of the bearing-portion wall of the accommodating part is curved, and at least one wall portion of the bearing-portion wall of the closing part is curved correspondingly. Those wall portions of the bearing-portion walls of the accommodating part and the closing part which engage through the through-openings of the respective other part are therefore curved so as to correspond to one another. If the closing part and the accommodating part are rotated relative to one another, the wall portions of the respective bearing-portion wall, which are curved so as to correspond to one another, can slide along one another. This results in particularly good guiding of the closing part in the accommodating part, or of the accommodating part in the closing part. In particular, this means that the closed position of the retaining device can be reached in a particularly simple and accurate manner. Preferably, the curvature of the wall portions can be circular. Thus, the at least one wall portion of the bearing-portion wall of the accommodating part can have circular curvature and the at least one wall portion of the bearing-portion wall of the closing part can have circular curvature corresponding thereto. It is also possible for the bearing-portion wall of the accommodating part to have multiple, in particular two, curved wall portions and for the bearing-portion wall of the closing part to have multiple, in particular two, correspondingly curved wall portions.

According to another embodiment, the at least one wall portion of the bearing-portion wall of the accommodating part can be curved concavely, while the at least one wall portion of the bearing-portion wall of the closing part is curved convexly. This permits particularly simple and secure guiding of the closing part with respect to the accommodating part. It is in particular possible for multiple, for example two, concave or convex wall portions to be provided.

According to another embodiment, the retaining device can be formed in one piece. Thus, the accommodating part and the closing part can initially be produced as a common part. In particular, the retaining device can be produced by plastics injection molding. It would also be possible for the retaining device to be produced from plastic, for example using a 3-D printing process. One-piece production is particularly efficient and cost-effective. Even in the case of a retaining device produced in one piece, the closing part and the accommodating part are mounted so as to be able to rotate with respect to one another by means of their respective bearing portions. If the closing part and/or the accommodating part are rotated relative to one another, the retaining device produced in one piece can then break down into a two-piece retaining device, while the respective bearing-portion walls still engage through the respective through-openings and thus the closing part and the accommodating part are securely held on one another.

Preferably, it can be provided that, in a production position of the retaining device, that is to say after creation, the accommodating part and the closing part are initially connected to one another (in one piece) via connecting portions, wherein, for the purpose of releasing the connection, the connecting portions can be broken apart by a relative rotation between the accommodating part and closing part. The entire retaining device, including the connecting portions, can for example be created in a single injection-molding operation. If, in the production position, the closing part and the accommodating part are rotated relative to one another, the connection between the accommodating part and the closing part is broken, in which case the connecting portions represent an intended break point. The retaining device can, in principle, be created in the closed position, in the open position or in any intermediate position. The retaining device is preferably created in the open position so that it is suitable for the intended use immediately after creation. A line that is to be accommodated in the retaining device can then be inserted directly without it being necessary to first shift the retaining device into the open position.

According to another embodiment, the closing part has a closure portion with at least one latching element and the accommodating part has a closure portion with at least one corresponding latching element, wherein, in the closed position of the retaining device, the corresponding latching elements engage with one another in a latching manner. The closure portions can serve to securely and releasably hold the accommodating part and closing part in the closing position. The mutually corresponding latching elements of the respective closure portion of the closing part or the accommodating part can for example be latching projections that engage in one another.

According to another embodiment, the retaining device consists of a filled plastics material, in particular of a plastics material filled with glass fibers and/or glass beads. Plastics of this kind are particularly strong and stable. In particular, this, in conjunction with the inventive connection via the bearing portions, also makes it possible for the accommodating part and the closing part not to be (non-destructively) separable from one another. It is also possible for the retaining device to consist of a non-filled plastics material, for example of polypropylene.

BRIEF DESCRIPTION OF THE DRAWINGS

An embodiment of the invention will be explained below with reference to schematic figures, in which:

FIGS. 5A and 5B show two section views of the retaining device shown in FIG. 1, FIG. 6 shows a side view of the retaining device of FIG. 1, in a half-closed position.

Figure 1:
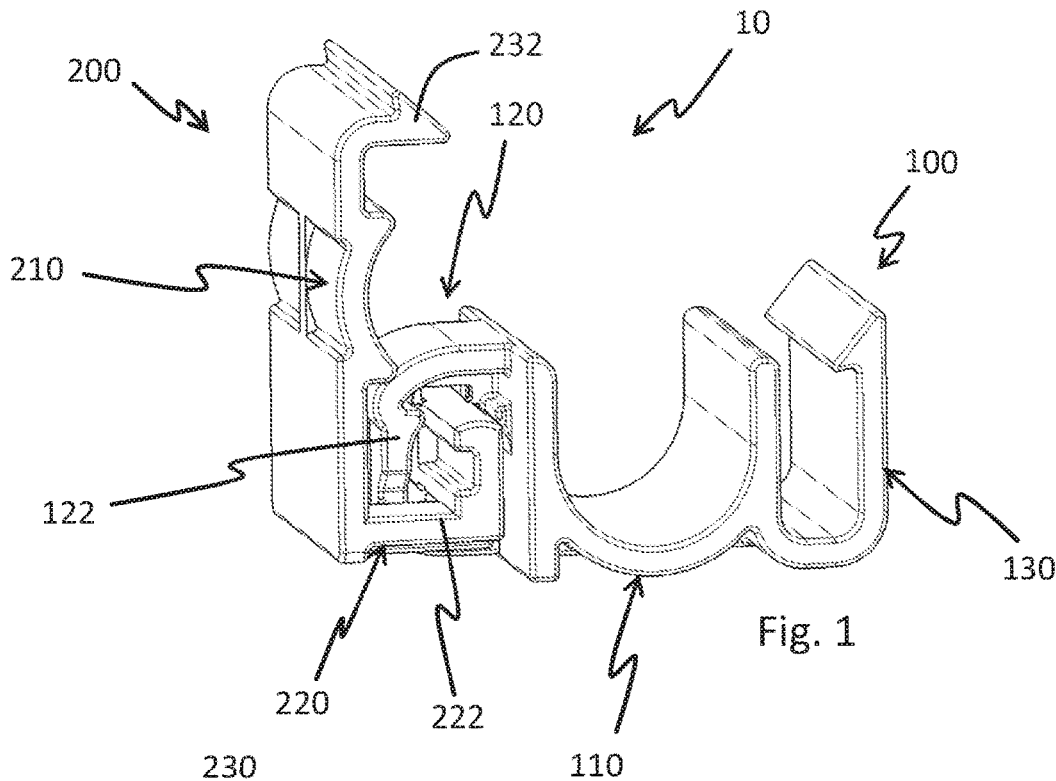
FIG. 1 shows a retaining device according to the invention in a perspective view.

Unless otherwise stated, in the figures identical reference signs denote identical items.

DETAILED DESCRIPTION

The figures show a retaining device 10 that comprises an accommodating part 100 and a closing part 200. The accommodating part 100 has a retaining portion 110, a bearing portion 120 and a closure portion 130. The bearing portion 120 of the accommodating part 100 has a bearing-portion wall 122 and a through-opening 124 which, in the example shown, is completely enclosed by the bearing-portion wall 122. The bearing-portion wall 122 thus extends completely around the through-opening 124. The closing part 200 also has a retaining portion 210, a bearing portion 220 and a closure portion 230. Equally, the bearing portion 220 has a bearing-portion wall 222 and a through-opening 224 which, in the example shown, is also completely enclosed by the bearing-portion wall 222. The bearing-portion wall 222 thus also extends completely around the through-opening 224. The closure portion 130 also has a latching element 132 which, in the closed position of the retaining device, engages with a latching element 232 of the closing part 200. A line (not shown) accommodated in the retaining device can thus be held securely between the retaining portion 110 that is adapted to the line and the retaining portion 210 that is adapted to the line.

Figure 7:
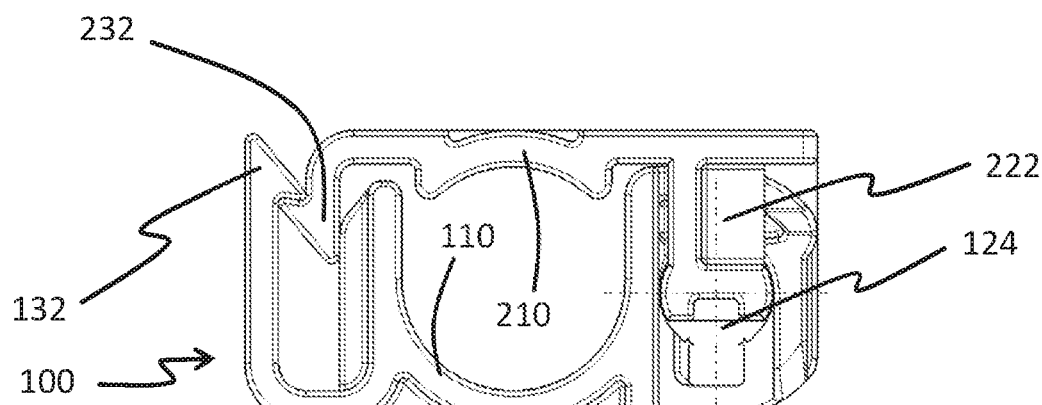
FIG. 7 shows another side view of the retaining device of FIG. 1, in the closed position.
Figure 8:
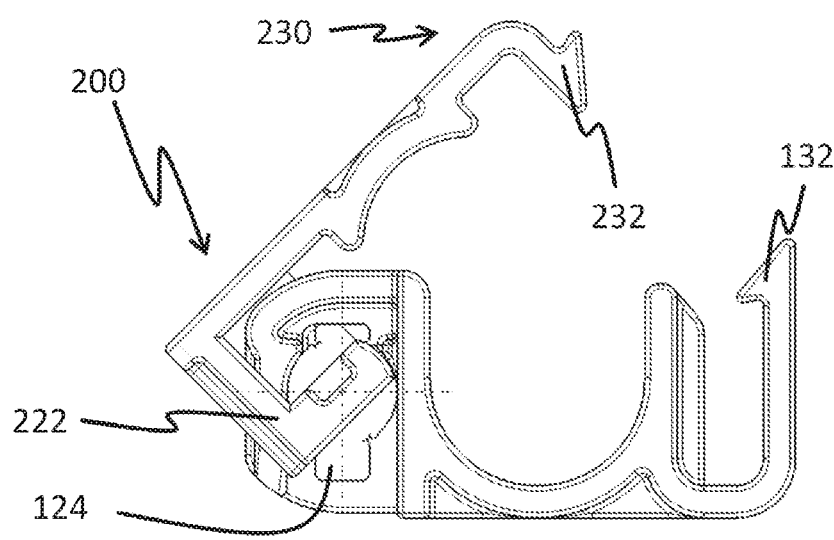
FIG. 8 shows the representation of FIG. 6 from an opposite side.
Figure 9:
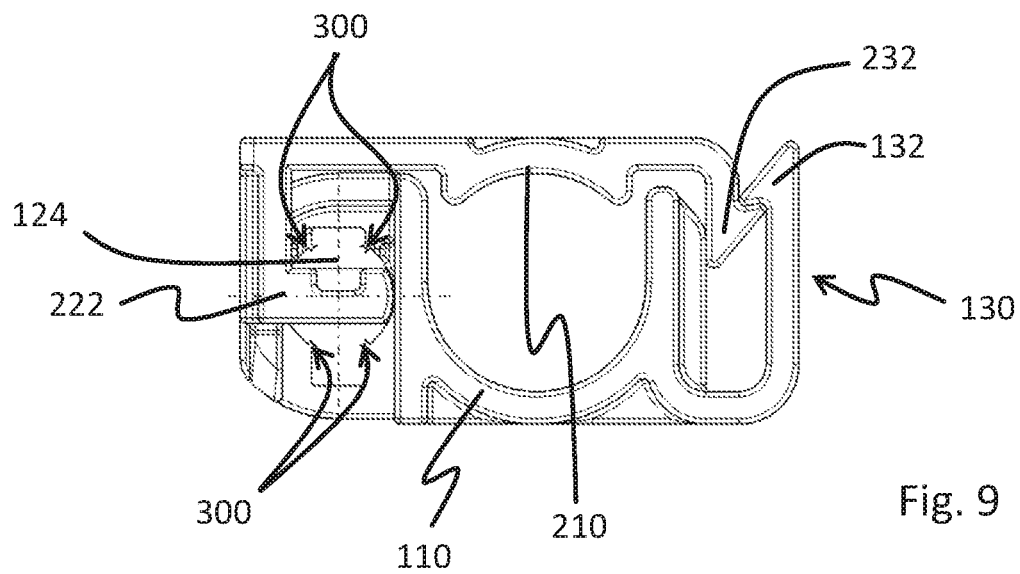
FIG. 9 shows the representation of FIG. 7 from an opposite side.

The bearing-portion wall 122 of the accommodating part 100 engages through the through-opening 224 of the closing part 200, while the bearing-portion wall 222 of the closing part 200 engages through the through-opening 124 of the accommodating part 100. Thus, the bearing portions 120, 220 engage with one another such that the accommodating part 100 and the closing part 200 are connected to one another captively and permanently. The closing part 200 and the accommodating part 100 are thus mounted on one another by means of their bearing-portion walls 122, 222 and through-openings 124, 224 such that they can be rotated relative to one another, for example from the open position shown in FIGS. 1 and 3, via an intermediate position shown in FIGS. 6 and 8, to the closed position of the retaining device as shown in FIGS. 7 and 9.

Furthermore, two wall portions 126, 126' of the bearing-portion wall 122 of the accommodating part 100 are concavely curved. The concave wall portions 126, 126' form an incomplete circle which is interrupted by two voids 128, with connecting portions 300 being formed at the interruptions. In addition, the concave wall portions 126, 126' bound the through-opening 124. The bearing-portion wall 222 of the closing part 200 has two convex wall portions 226, 226' which are designed so as to correspond to the concave wall portions 126, 126' of the bearing-portion wall 122 of the accommodating part 100. Thus, the concave wall portions 126, 126' and the convex wall portions 226, 226' have, in particular, the same curvature. When the closing part 200 and the accommodating part 100 are moved relative to one another, the convex wall portions 226, 226' of the closing part 200 slide along the concave wall portions 126, 126' of the accommodating part 100. Thus, the closing part 200 is guided in its movement with respect to the accommodating part 100. This guiding ensures that the closure portions 130, 230 meet reliably and the latching elements 132, 232 engage in one another.

Figure 2:
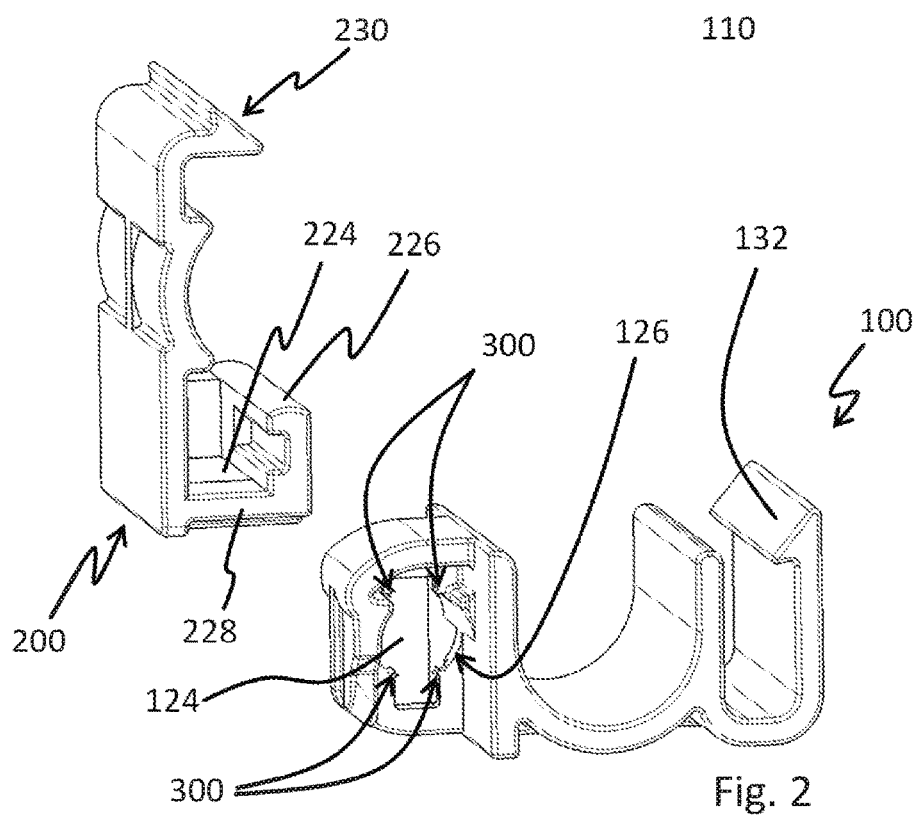
FIG. 2 shows the representation of FIG. 1 with the accommodating part and the closing part shown separately for the sake of clarity.
Figure 3:
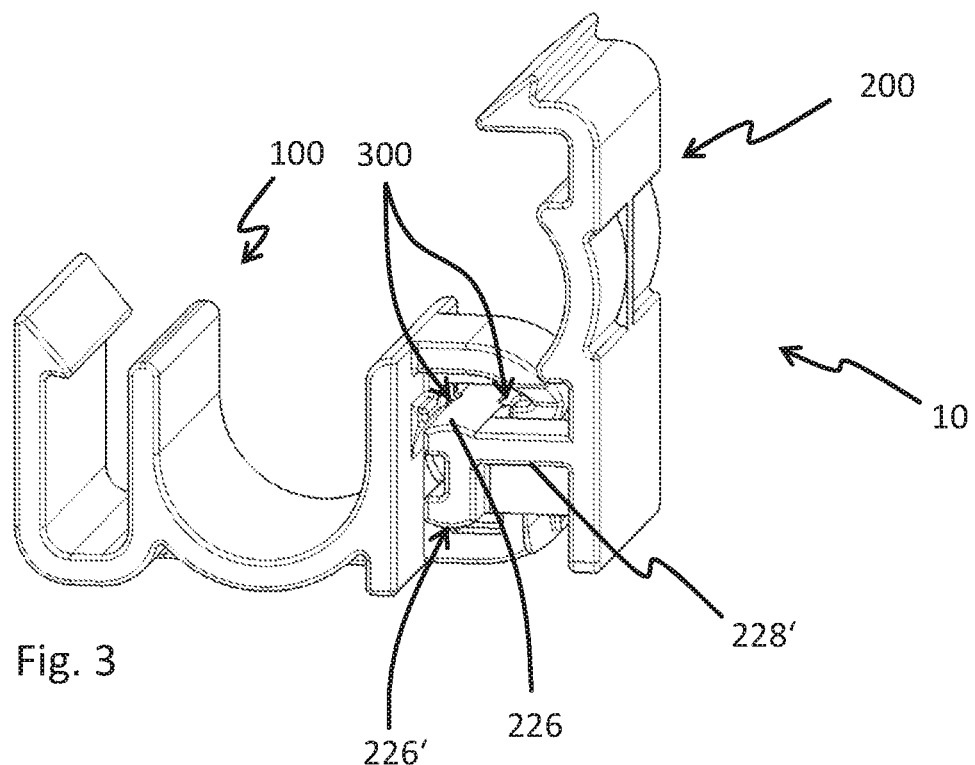
FIG. 3 shows the retaining device of FIG. 1 in another perspective view.
Figure 4:
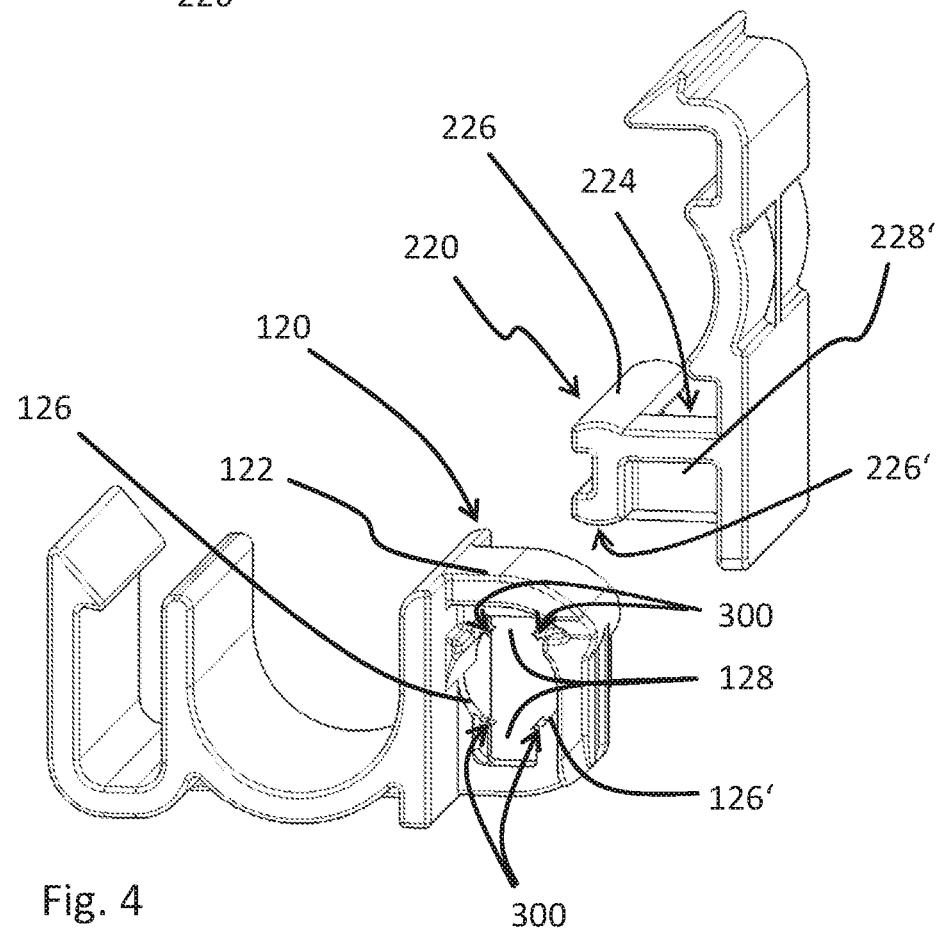
FIG. 4 shows the representation of FIG. 3 with the accommodating part and the closing part shown separately for the sake of clarity.

The retaining device 10 can be produced by plastics injection molding and, after production, can be in a production position in which the retaining device is initially in one piece, that is to say that the accommodating part 100 and the closing part 200 are connected to one another. In that context, the retaining device 10 can in particular be produced in the open position, as shown in FIGS. 1, 3 and 5. In this production position, the accommodating part 100 and the closing part 200 are initially connected to one another via, in the example shown, four connecting sections 300, of which two are shown in FIG. 3. The separate representations of the accommodating part 100 and the closing part 200 (FIGS. 2 and 4) show all four connecting portions 300, separated from the closing part. If the accommodating part 100 and the closing part 200 are rotated relative to one another, the connection between the accommodating part 100 and the closing part 200 is broken by virtue of the connecting portions 300 breaking. Therefore, these form designated rupture points. The retaining device 10 can be delivered in the open position as the production position and is immediately available for installation of lines. Thus, production by plastics injection molding is particularly efficient.

In addition, the bearing-portion wall 222 of the closing part 200 has a first lateral web 228 and a second lateral web 228'. The bearing-portion wall 222 thus comprises the curved wall portion 226 and also the webs 228, 228'. The bearing-portion wall 122 comprises the curved wall portions 126, 126' and the voids 128. The voids 128 are in principle optional but simplify production by injection molding and ensure that the accommodating part 100 and the closing part 200 are connected to one another at just four points, namely the above-mentioned connecting portions 300. The webs 228, 228' of the bearing-portion wall 222 are formed offset with respect to one another and are of different sizes. This also simplifies production by injection molding. However, the webs 228, 228' may also in principle be symmetric.

Figure 10:
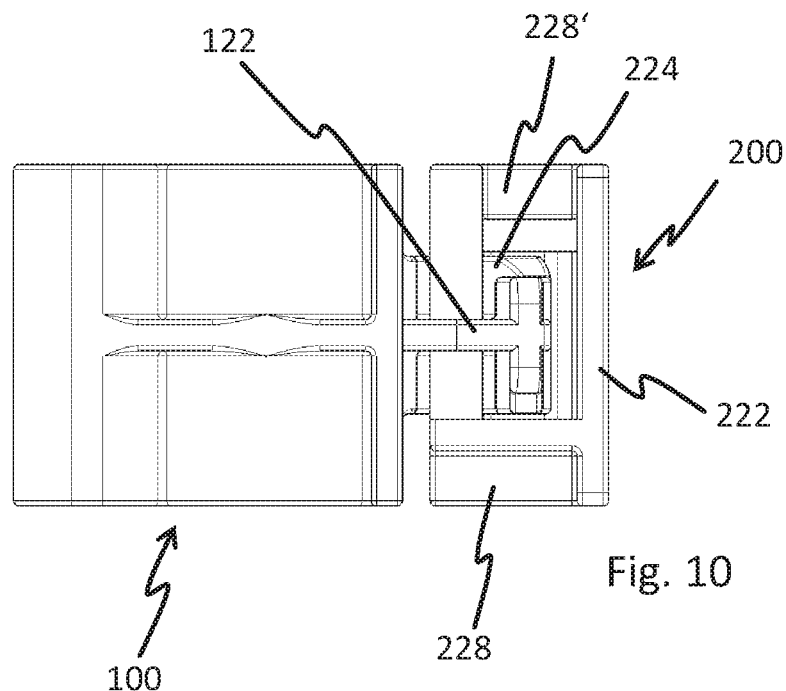
FIG. 10 shows the retaining device of FIG. 3 in a view from below.
Figure 11:
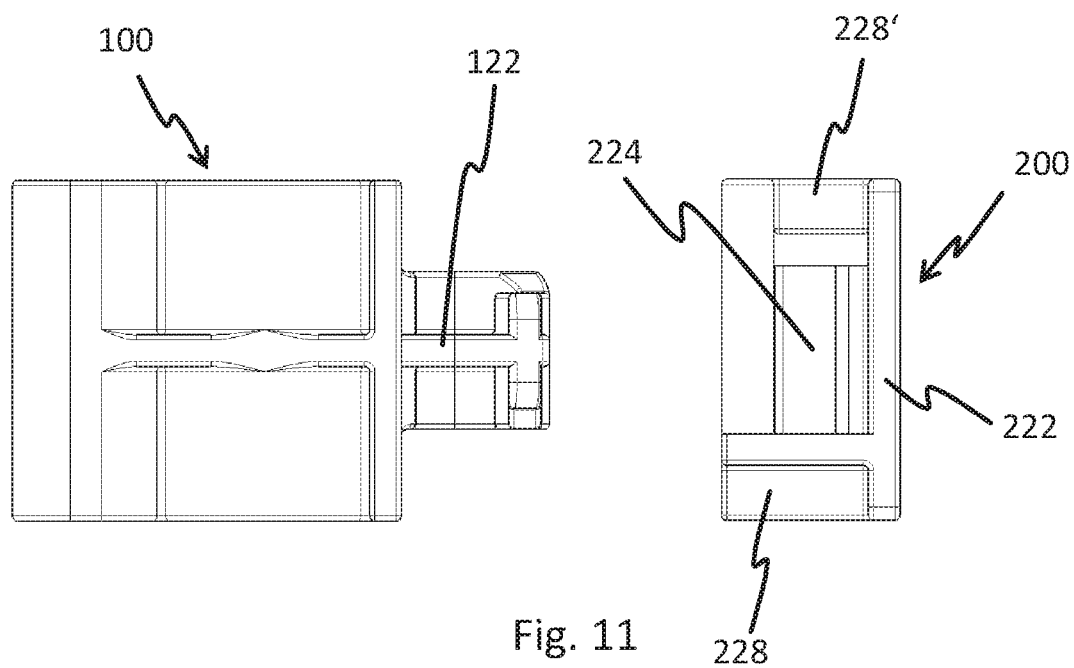
FIG. 11 shows the retaining device of FIG. 4 in a view from below.

FIGS. 10 and 11 show the retaining device 10 according to the invention in a view of the underside of the retaining device 10, with FIG. 10 showing the accommodating part 100 and the closing part 200 connected to one another and FIG. 11 showing the accommodating part 100 and the closing part 200 separate from one another. The open position of the retaining device 10 depicted in FIG. 10 shows particularly clearly that the bearing-portion wall 122 of the accommodating part 100 engages through the through-opening 224 of the closing part 200.

LIST OF REFERENCE SIGNS

10 Retaining device
100 Accommodating part
110 Retaining portion
120 Bearing portion 122 Bearing-portion wall
124 Through-opening
126, 126' Concave wall portions
128 Voids
130 Closure portion
132 Latching element
200 Closing part
210 Retaining portion
220 Bearing portion
222 Bearing-portion wall
224 Through-opening
226, 226' Convex wall portions
228, 228' Lateral webs
230 Closure portion
232 Latching element
300 Connecting portions

The invention claimed is:

1. A device for retaining a line, comprising an accommodating part (100) having at least one retaining portion (110), which is adapted to a line which is to be accommodated, and having a bearing portion (120), and also comprising a closing part (200) having a bearing portion (220), wherein the closing part (200) is mounted on the bearing portion (120) of the accommodating part (100) via the bearing portion (220), wherein the accommodating part (100) and the closing part (200) are connected to one another via connecting portions (300), wherein, for releasing the connection between the accommodating part and the closing part, the connecting portions (300) can be broken apart by a relative rotation between the accommodating part (100) and closing part (200), and therefore the closing part (200) can be adjusted between an open position, in which the closing part frees the at least one retaining portion (110), and a closed position, in which the closing part closes the at least one retaining portion (110), wherein the bearing portion (120) of the accommodating part (100) forms a through-opening (124) which is enclosed by a bearing-portion wall (122), and in that the bearing portion (220) of the closing part (200) forms a through-opening (224) which is enclosed by a bearing-portion wall (222), wherein the bearing-portion wall (122) of the accommodating part (100) engages through the through-opening (224) of the closing part (200), and wherein the bearing-portion wall (222) of the closing part (200) engages through the through-opening (124) of the accommodating part (100).

2. The retaining device as claimed in claim 1, characterized in that at least one wall portion (126, 126') of the bearing-portion wall (122) of the accommodating part (100) is curved, and in that at least one wall portion (226, 226') of the bearing-portion wall (222) of the closing part (200) is curved correspondingly.

3. The retaining device as claimed in claim 2, characterized in that the at least one wall portion (126, 126') of the bearing-portion wall (122) of the accommodating part (100) is curved concavely, and in that the at least one wall portion (226, 226') of the bearing-portion wall (222) of the closing part (200) is curved convexly.

4. The retaining device as claimed in claim 1, characterized in that the retaining device (10) is formed in one piece.

5. The retaining device as claimed in claim 1, characterized in that the closing part (200) also has a closure portion (230) with at least one latching element (232) and the accommodating part (100) has a closure portion (130) with at least one corresponding latching element (132), wherein, in the closed position of the retaining device (10), the corresponding latching elements (132, 232) engage with one another in a latching manner.

6. The retaining device as claimed in claim 1, characterized in that the retaining device (10) is formed of a plastics material filled with glass fibers and/or glass beads.

7. The retaining device as claimed in claim 1, characterized in that the retaining device (10) is formed of a non-filled plastics material.

8. A device for retaining a line, comprising:
an accommodating part (100) having at least one retaining portion (110), which is shaped and configured to receive a line, and having a bearing portion (120),
a closing part (200) having a bearing portion (220),
wherein the closing part (200) is mounted on the bearing portion (120) of the accommodating part (100) via its bearing portion (220), wherein a connection portion (300) connects the bearing portion (120) of the accommodating part (100) to the bearing portion (220) of the closing part (200) for holding the closing part (200) in an open position relative to the accommodating part (100), wherein the connection portion is breakable to permit rotation of the closing part (200) between the open position, in which the closing part is positioned to enable access to the at least one retaining portion (110) for line placement therein, and a closed position, in which the closing part covers the at least one retaining portion (110) for line retention therein,
wherein the bearing portion (120) of the accommodating part (100) forms a through-opening (124) which is enclosed by a bearing-portion wall (122), and the bearing portion (220) of the closing part (200) forms a through-opening (224) which is enclosed by a bearing-portion wall (222), wherein the bearing-portion wall (122) of the accommodating part (100) engages through the through-opening (224) of the closing part (200), and wherein the bearing-portion wall (222) of the closing part (200) engages through the through-opening (124) of the accommodating part (100).

9. The retaining device of claim 8, wherein the accommodating part and the closing part are formed of a molded plastics material.

* * * * *